(12) United States Patent
Prueitt

(10) Patent No.: US 6,185,940 B1
(45) Date of Patent: Feb. 13, 2001

(54) EVAPORATION DRIVEN SYSTEM FOR POWER GENERATION AND WATER DESALINIZATION

(76) Inventor: Melvin L. Prueitt, 161 Cascabel, Los Alamos, NM (US) 87544

( * ) Notice: Under 35 U.S.C. 154(b), the term of this patent shall be extended for 0 days.

(21) Appl. No.: 09/248,666

(22) Filed: Feb. 11, 1999

(51) Int. Cl.$^7$ .................................................. F01K 25/06
(52) U.S. Cl. .............................................. 60/649; 60/673
(58) Field of Search ............................... 60/649, 673, 398

(56) References Cited

U.S. PATENT DOCUMENTS

| | | | |
|---|---|---|---|
| 3,906,250 | * 9/1975 | Loeb | .................. 60/649 X |
| 3,978,344 | * 8/1976 | Jellinek | .................. 60/649 X |
| 4,171,409 | 10/1979 | Loeb | .................. 429/17 |
| 4,193,267 | 3/1980 | Loeb | .................. 60/649 |
| 4,283,913 | 8/1981 | Loeb | .................. 60/641 |
| 4,617,800 | * 10/1986 | Assaf | .................. 60/649 X |
| 5,622,605 | 4/1997 | Simpson et al. | .................. 203/10 |
| 5,645,693 | 7/1997 | Göde | .................. 202/173 |
| 5,755,102 | 5/1998 | Assaf et al. | .................. 60/641.8 |
| 5,784,866 | 7/1998 | Prueitt | .................. 60/649 |

\* cited by examiner

Primary Examiner—Hoang Nguyen

(57) ABSTRACT

An apparatus and method generates energy and, optionally, produces fresh water using osmotic processes that are driven by energy embodied in the heat of evaporation of water. An osmotic chamber transfers fresh water into a brine solution by osmotic pressure across an osmotic membrane. A mass transfer unit uses the osmotic pressure to maintain a high pressure concentrated brine solution within the osmotic chamber while providing for replenishing diluted brine solution with concentrated brine solution. The volume increase in the concentrated brine solution as it is diluted drives a motor to generate useful output energy. A concentrator uses dry air to concentrate dilute brine solution from the motor to a concentrated brine solution for return to the osmotic chamber.

9 Claims, 4 Drawing Sheets

EVAPORATION DRIVEN SYSTEM FOR POWER GENERATION AND WATER DESALINIZATION

FIELD OF THE INVENTION

This invention relates to applications of energy in concentrated brine, and, more particularly, to the use of concentrated brine to drive osmosis processes for generating electricity and producing fresh water.

BACKGROUND OF THE INVENTION

Osmosis is a process wherein fluid moves through a semipermeable membrane in an attempt to equalize the chemical potential across the membrane. This process most commonly occurs when fluids having different concentrations of brine, e.g., salt solutions, are placed on opposite sides of the semipermeable membrane. A resulting potential energy, osmotic pressure, is produced that can be converted to mechanical and electrical energy.

U.S. Pat. No. 3,978,344, issued Aug. 31, 1976, to Jellinek, teaches a body of salt water and a body of fresh water, both at ambient pressure, in contact with opposite sides of a semipermeable membrane. Fresh water passes through the membrane with a concomitant build-up of osmotic pressure that causes salt water to be ejected through an orifice and directed against turbine blades to produce mechanical or electrical energy. The salt water and fresh water adjacent the membrane surfaces are simply replaced from adjacent fluid reservoirs.

U.S. Pat. No. 4,283,913, issued Aug. 18, 1981, to Loeb, teaches a low pressure fluid with little or no brine concentration and a pressurized brine solution on opposite side of a semipermeable membrane where the movement of fluid across the membrane forces the brine solution to flow through a turbine to generate mechanical or electrical energy. The depressurized brine solution is then passed to a saturated solar pond where solar energy acts to separate the fluid therein into a vertical gradient of concentrations so that high concentration brine may be removed at one location and low concentration brine at another position. Now the high concentration brine must be pressurized by a relatively high pressure pump for return to the membrane chamber with a concomitant consumption of electrical or mechanical energy and resulting loss of overall process efficiency.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The invention embodied and broadly described herein is directed to an apparatus and method for the generation of energy and, optionally, for producing fresh water using osmotic processes that are driven by energy embodied in brine that is concentrated by the evaporation of water. A first water supply contacts a first side of an osmotic membrane while a high pressure concentrated brine solution contacts a second side of the osmotic membrane where the brine solution has a salt concentration effective for fresh water to flow from the first water supply into the brine solution by osmotic pressure across the membrane. A first mass transfer unit defines a first volume and a second volume, where the first and second volumes are separated by a first movable interface. A concentrator uses dry air to concentrate a dilute brine solution to a concentrated brine solution.

A first piping system is connected to direct the high-pressure concentrated brine solution across the second face of the membrane and has first and second outlets. A motor is connected to the first outlet of the first piping system and has an outlet connected to the concentrator. A first three-way valve connects the first volume of the first mass transfer unit to the first piping system or to the concentrator. A second piping system is connected to the concentrator for returning concentrated brine from the concentrator to the second volume of the first mass transfer unit. A third piping system is connected to the first piping system for moving concentrated brine from the second volume of the first mass transfer unit to the first piping system. A second three-way valve connects the second volume of the first mass transfer unit to the second or third piping systems for alternately receiving concentrated brine from the concentrator and delivering the concentrated brine to the osmotic chamber to replenish the brine that has been diluted by transfer of fresh water across the osmotic membrane.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

The present invention enables the production of energy by a motor connected to a high pressure brine system where high pressure, high concentration brine is continuously supplied to an osmotic chamber without the inefficiencies of a high-pressure pump and associated electric motor. A mass transfer unit (MTU) is alternately connected to the high-pressure brine system and a low pressure concentrating system.

The MTU receives concentrated brine at low pressure from a concentrator and transfers the concentrated brine at high pressure into an osmotic chamber. A low-pressure pump is the only pump required to move the high-pressure concentrated brine.

Figure 1:
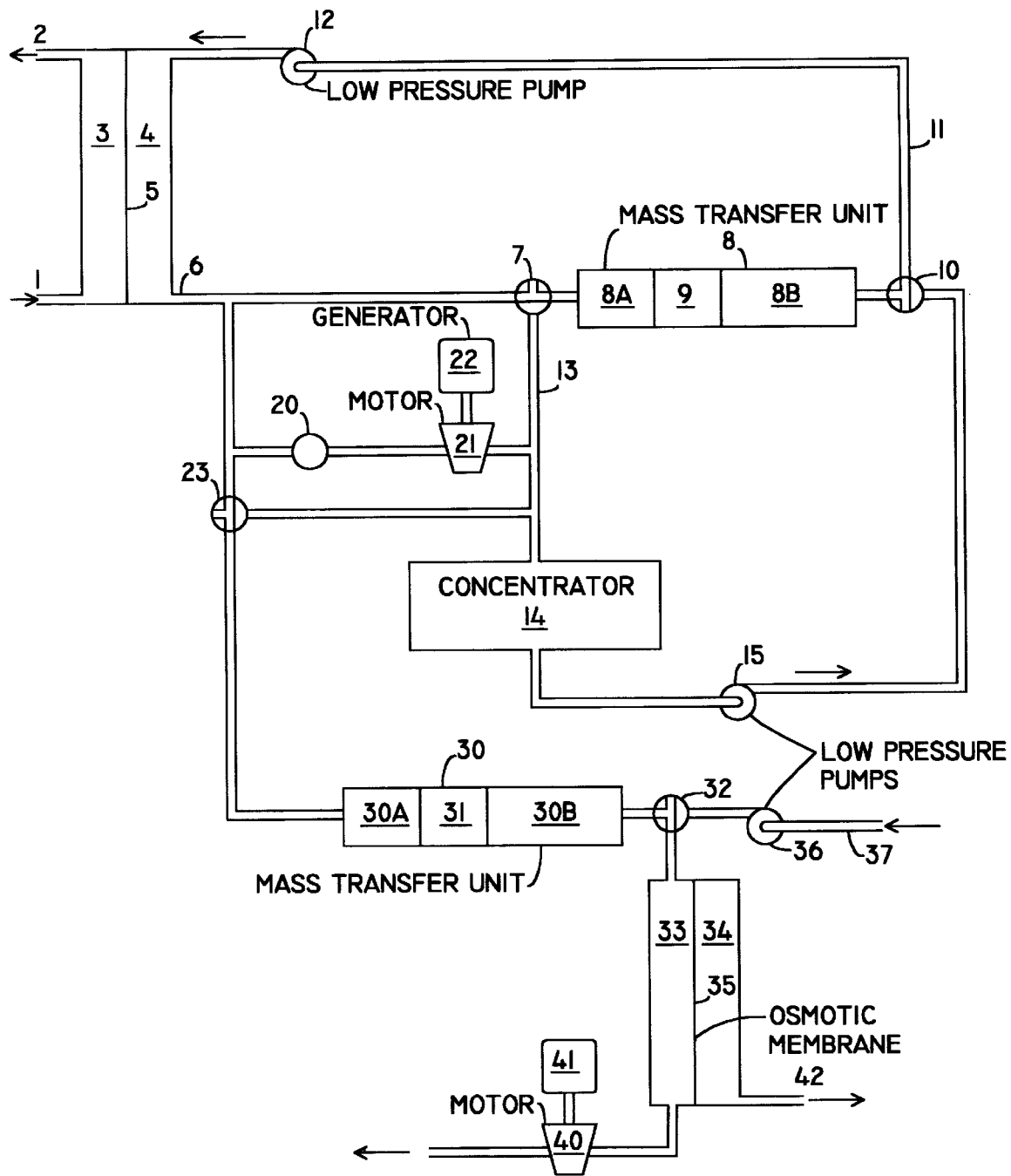
FIG. 1 schematically depicts a system using osmosis to generate useful output energy and to produce purified water from a solution containing the water.

Referring first to FIG. 1, there is shown a schematic depiction of a system using osmosis to generate useful output energy and produce purified water from brackish water. Fresh water or a relatively low concentration brine solution, such as sea water and the like, is introduced into the inlet 1 of an osmotic chamber having an outlet 2, first osmotic volume 3 for the input water, and second osmotic volume 4 for a high pressure, relatively high concentration brine solution, where first volume 3 and second volume 4 are separated by osmotic membrane 5. In accordance with conventional principles of osmosis, pure water passes through osmotic membrane 5 to attempt to equalize chemical potentials on either side of membrane 5 while diluting the concentration of brine in volume 4. The fluid pressure in volume 4 is greater than the pressure in volume 3, but the osmotic pressure arising from the difference in salt concentration in the fluids in volume 3 and 4 is sufficient to produce a fluid flow that is opposite to the fluid pressure differential.

In a preferred embodiment, fluid flow through volume 3 is opposite to the fluid flow through volume 4. In this manner, when a fluid is input through inlet 1, the concentration of salt in the fluid in volume 3 will be least when it is opposite a brine solution in volume 4 having a lower concentration from pure water transfer from the fluid in volume 3. Then the salt concentration in volume 3 will be greatest at the location where the brine concentration is highest in volume 4. The arrangement tends to even out the osmotic pressure differential across membrane 5.

The increase in fluid volume in volume 4 is accommodated by a first piping system 6 that has a first outlet connected to first MTU 8 through valve 7, which is preferably a three-way valve. First piping system 6 is also connected to motor 21 through a shutoff valve 20, and, optionally, to a second MTU 30. Motor 21 is any convenient means for converting fluid flow to output mechanical electrical energy.

Examples of suitable motors are fluid turbines and hydraulic motors. Motor 21 is connected to an output device 22, which may be an electrical generator or some mechanical energy system. As more fully explained below, first and second MTUs 8 and 30 enable their working brine solutions to be replaced while the brine solution in first piping system 6 remains at a high pressure without any need for high pressure pumps that consume large amounts of energy with a concomitant reduction in the system overall efficiency. Energy produced by output device 22 with its inefficiencies is not further diverted to an inefficient electric motor to drive a high-pressure pump.

The low pressure diluted concentrated brine solution that is output from motor 21 is input to concentrator 14 and returned for reuse through a second piping system by a low pressure pump 15. The output from pump 15 is connected to MTU 8 through three-way valve 10.

Dry air is blown through concentrator 14 to remove moisture from the brine and reconcentrate the brine solution that has been diluted in volume 4 by the flow of fresh water through osmotic membrane 5. Suitable concentrators are described in U.S. Pat. No. 5,784,886, issued Jul. 28, 1998, to Prueitt, and incorporated by reference herein. Generally, a large surface area of brine is contacted with relatively dry air to evaporate water from the diluted solution and reconcentrate the solution. Exemplary systems include a series of flat sheets over which the brine flow while dry air is passed along the brine surfaces or a spray system with brine droplets falling through a counter-flowing column of dry air.

In operation, high pressure, concentrated brine solution in volume 4 is diluted by fresh water flow through osmotic membrane 5. The volume increase produces a flow of diluted concentrated brine solution through piping system 6 to first volume 8A of MTU 8 and through valve 20 to motor 21. The flow of high pressure concentrated brine solution into first volume 8A moves an interface 9, which may be a piston, membrane, or other movable interface, to output concentrated brine solution from second volume 8B of MTU 8 into third piping system 11 through three-way valve 10, which is operated to connect second volume 8B with third piping system 11. Low pressure pump 12 acts to maintain the correct direction of flow of the high pressure concentrated brine solution through volume 4 of the osmotic chamber so that the diluted concentrated brine solution is periodically replaced with the concentrated brine solution that is output from concentrator 14.

When interface 9 has moved to substantially empty second volume 8B, a control system (not shown) acts to move three-way valves 7 and 10 so that MTU 8 is now at low pressure with volume 8A connected to the input of concentrator 14 and volume 8B connected to the output of low pressure pump 15. Pump 15 then moves concentrated brine solution from concentrator 14 into second volume 8B to move interface 9 toward first volume 8A. Any diluted concentrated brine solution in first volume 8A is then moved into concentrator 14 to be concentrated for replacing diluted concentrated brine solution in volume 4 of the osmotic chamber. When first volume 8A of MTU 8 is substantially emptied, three-way valves 7, 10 are again operated to reconnect MTU 8 to high-pressure operation. Since the system formed by piping systems 6 and 11 and MTU 8 is a solid liquid system, it will be appreciated that only a small amount of compression is required to repressurize the liquid in second volume 8B for return to second osmotic volume 4.

The control system required for the operation of three-way valves is generally conventional and is not described herein. Suitable controls may be interface movement sensors, pressure sensors, flow sensors, and the like, that sense a condition suitable for the movement of three-way valves 7 and 10. For example, if interface 9 is a mechanical or hydraulic piston, then simple location sensors might be used. Likewise, fluid flow sensors provide a ready indication when, e.g., second volume 8B has been filled or emptied and fluid flow to/from the volume ceases. The three-way valves contemplated herein are electrically or hydraulically operated in response to signals from installed sensors.

In accordance with another aspect of the present invention, high-pressure brine solution in piping system 6 may also be connected to a second MTU 30 through three-way valve 23. The high pressure brine solution enters first volume 30A of MTU 30 to move interface 31 into second volume 30B to transfer a brackish fluid, e.g., sea water, therein into a first volume 33 of a reverse osmosis chamber that passes the brackish fluid along one side of reverse osmotic membrane 35 so that fresh water is transported to second volume 34. Fresh water is then outputted through outlet 42. The high pressure brine solution in first volume 30A produces a high pressure in brackish water in second volume 30B and first volume 33 of the reverse osmosis chamber to support the reverse osmosis process while the pressurized brackish water is output through motor 40. Motor 40 is connected to an electrical generator, mechanical energy converter, or the like, 41 to further use the energy stored in the brine solution that is concentrated in concentrator 14.

The reverse osmosis unit is recharged by connecting first volume 30A of MTU 30 to low pressure concentrator 14 by moving three-way valve 23 to disconnect from piping system 6. Three-way valve 32 is then aligned to input brackish water from inlet 37 through pump 36 into second volume 30B of MTU 30. The low pressure of pump 36 is sufficient to move interface 31 from second volume 30B toward first volume 30A. Thus, diluted concentrated brine solution in first volume 30A is transferred to concentrator 14 as second volume 30B is refilled with brackish water. Once second volume 30B is filled, three-way valves 23 and 32 are again moved to connect MTU 30 as described above to produce fresh water and output energy.

Note that the concentrated brine solution is basically a closed system and will not be contaminated with fouling agents that may be present in the fresh water or brackish water supplies in the osmosis and reverse osmosis chambers. It is contemplated that the concentrated brine will be formed from distilled water and a pure salt, but some contamination may occur during reconcentrating in concentrator 14. It is preferable to include some filtration of the output from concentrator 14. Likewise, it is preferable to prefilter the external water supplies to the osmosis and reverse osmosis units to prevent fouling of the osmotic membranes.

In one embodiment, MTU 8 can be a set of parallel cylinders and pistons that operate out of phase to maintain a relatively smooth flow of diluted concentrated brine solution out of second volume 4 of the osmosis chamber. That is, one first volume 8A would be connected to concentrator 14 to be emptied when a second parallel first volume 8A is connected to high-pressure brine solution and vice versa. MTU 30 may be similarly configured.

Figure 2:
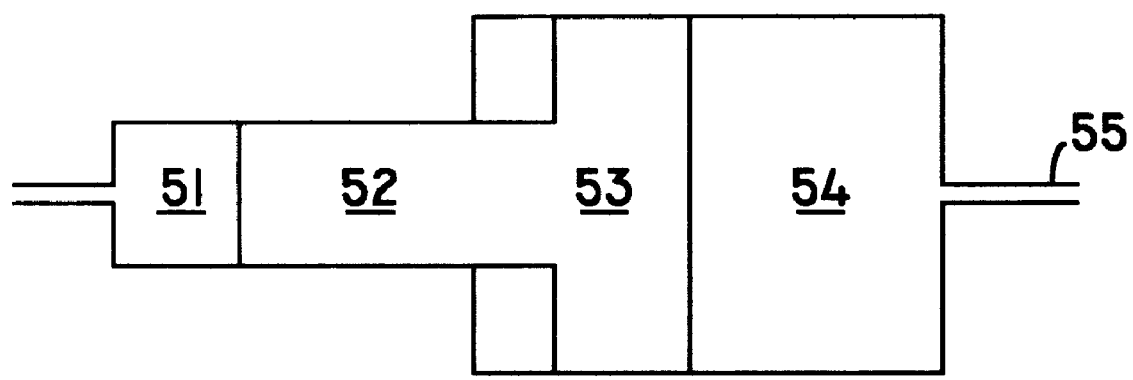
FIG. 2 is a cross-sectional view of a mass transfer unit/piston arrangement having a high pressure, low volume fluid on one side with a relatively small surface area and a low pressure, high volume fluid on the other side with a relatively large surface area.

FIG. 2 is a cross-section view of one embodiment of a MTU for use in the reverse osmosis system, i.e., for MTU 30. The brine pressure in piping system 6 (FIG. 1) will normally be much greater than required by the reverse osmosis unit for fresh water production. Accordingly, a cylinder-piston arrangement, such as depicted in FIG. 2, may be used to amplify flow through MTU 30. High pressure brine solution from valve 23 (FIG. 1) enters into a small diameter cylinder 51 to exert pressure against a relatively small diameter piston 52 to move a relatively large diameter piston 53 in cylinder 54 to displace a larger volume of fluid through outlet 55 to the reverse osmosis chamber than is input to volume 51.

The osmotic pressure of highly concentrated brine solutions can be quite high. Where the mechanical strength of system components becomes a limiting factor in energy production, the pressure difference can be spread over two or more stages with ever increasing brine concentration. A two stage system is shown in FIG. 3, although additional stages may be added according to the teachings herein.

Figure 3:
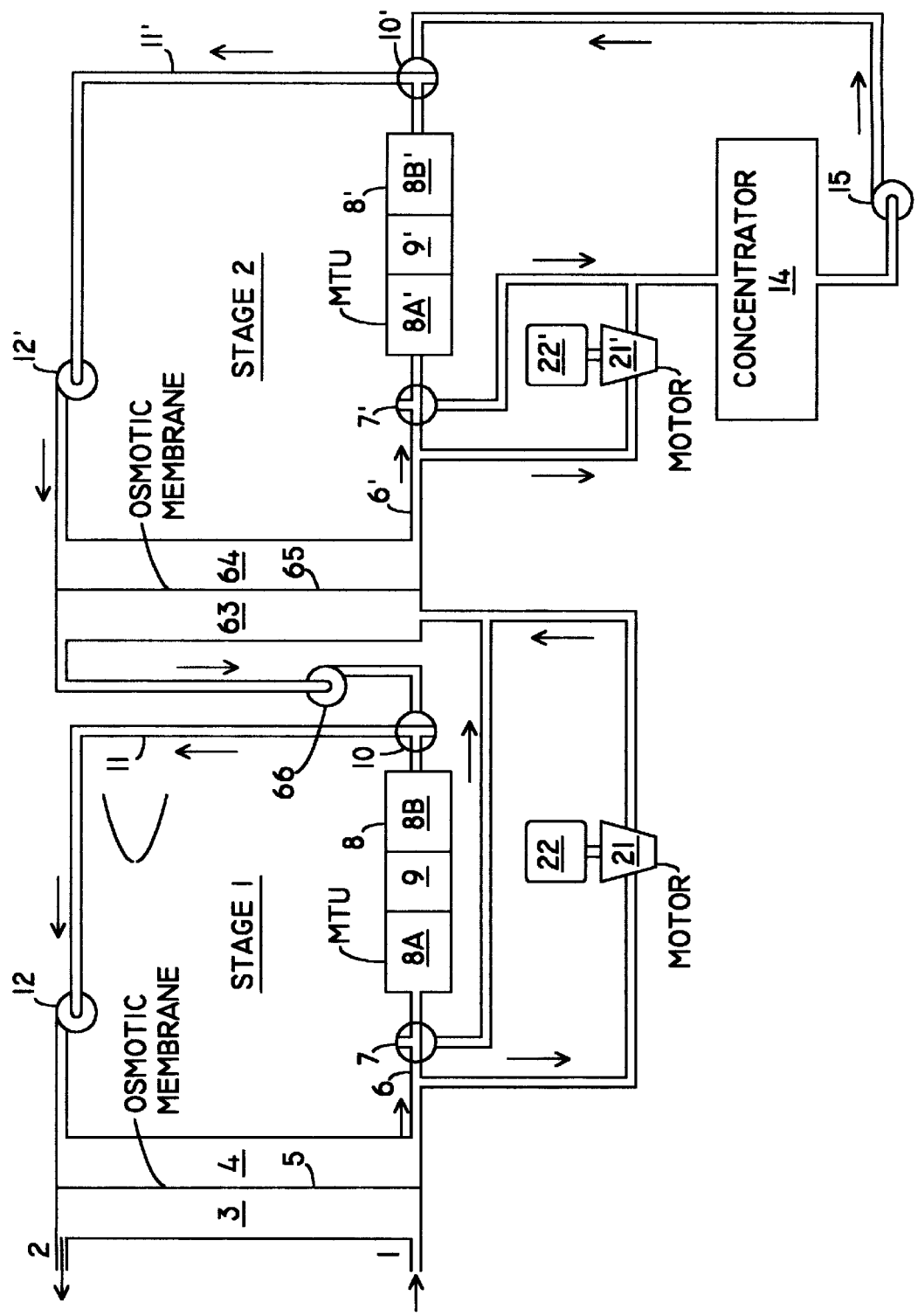
FIG. 3 schematically depicts a multiple stage system for generating energy and purifying fluid as described for FIG. 1.

Referring now to FIG. 3, the component parts are labeled with numbers and primed numbers corresponding to the numbered components shown in FIG. 1, where each component performs the same function as the corresponding component described for FIG. 1. Again, a fresh water or brackish water supply is input 1 to first osmotic volume 3 of an osmotic chamber and is output 2 back to the environment. A first high-pressure concentrated brine solution is input from low pressure pump 12 to second osmotic volume 4 that is separated from first osmotic volume 3 by osmotic membrane 5. The concentrated brine solution in second osmotic volume 4 is diluted by fresh water flow through osmotic membrane 5.

A first portion of the diluted concentrated brine solution flows in piping system 6 into motor 21 for use by an energy producing output device 22. A second portion of the diluted concentrated brine solution may be connected through three-way valve 7 into first volume 8A of MTU 8 in order to displace first interface 9 into second volume 8B to move concentrated brine solution from second volume 8B through three way valve 10 back into second osmotic volume 4. As discussed above, when interface 9 has moved a selected distance, valves 7 and 10 are actuated to connect volumes 8A and 8B to a concentrator for reconcentrating the brine solution.

In the multi-stage system shown in FIG. 3, the brine concentrator for a first stage is a second stage. Low pressure diluted concentrated brine solution from turbine 21 and second volume 8A from MTU 8 is directed into first osmotic volume 63 of a second osmotic chamber so that fresh water flows through osmotic membrane 65 and into a higher concentration brine solution in second osmotic volume 64. The reconcentrated brine solution from stage I is then pumped by low pressure pump 66 through three-way valve 10 into second volume 8B of MTU 8 to displace interface 9 back into first volume 8A.

The second stage then operates like the system described in FIG. 1. High pressure diluted concentrated brine solution actuates MTU 8' to move concentrated brine solution in second volume 8B' through low-pressure differential pump 12' and into second osmotic volume 64. Additional high pressure diluted concentrated brine solution is also directed through motor 21' connected to energy output device 22'. Low pressure diluted concentrated brine solution from motor 21' and first volume 8A' is directed into concentrator 14 for return to second volume 8B'.

Although not shown in FIG. 3, fresh water production and ancillary energy production could also be obtained through reverse osmosis units connected to one or to all of the osmosis stages.

Figure 4:
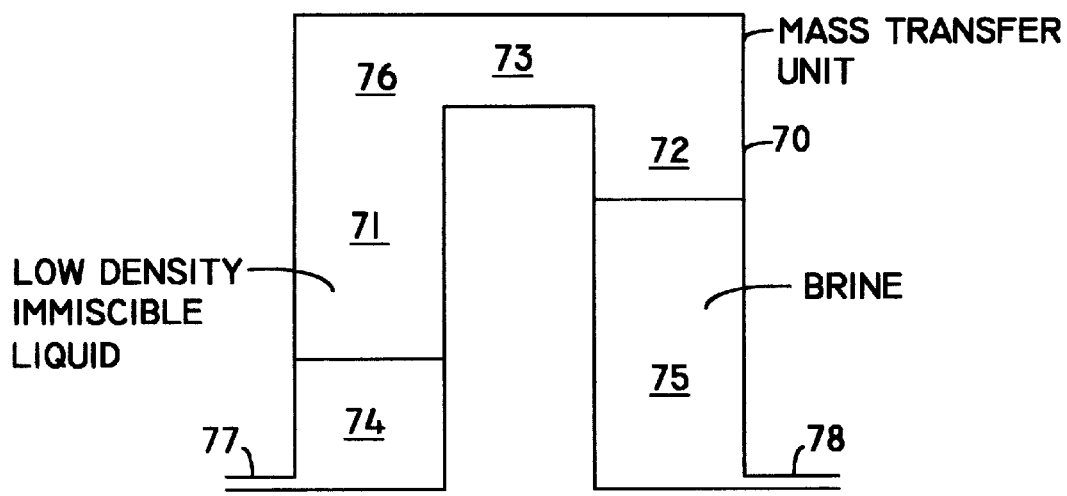
FIG. 4 is a cross-section of one embodiment of a mass transfer unit according to the present invention.

The MTUs discussed above are depicted as moving pistons in cylindrical containers, but the MTU function can be obtained from any device having input and output volumes that are separated by a moving interface. In one embodiment shown in FIG. 4, MTU 70 has first volume 75 for receiving/discharging fluid through pipe 78 and second volume 74 for receiving/discharging fluid through opening 77. Volumes 71 and 72 are connected by conduit 73. A low density immiscible liquid 76, such as oil, is contained in conduit 73 and in volumes 72 and 71. The immiscible liquid volume then acts as a liquid piston with very little energy lost to friction. MTU 70 is best suited to relatively slow movements so that there is no turbulent flow that acts to mix the immiscible fluid with the brine solution. A high-density immiscible fluid can be used if the unit shown in FIG. 4 is inverted so that gravity maintains separation of the liquids.

Figure 5:
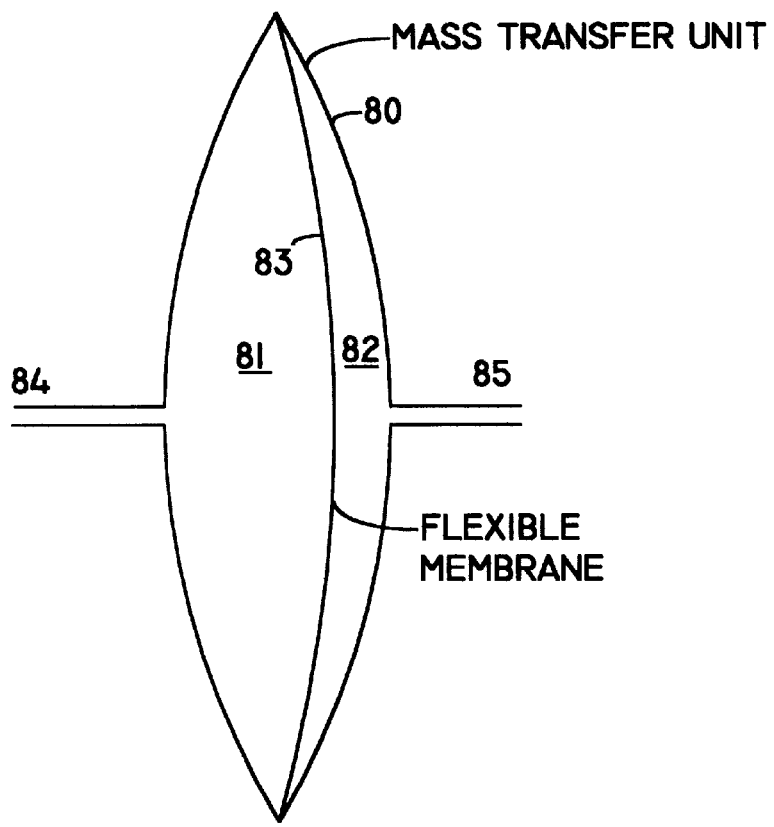
FIG. 5 is a cross-section of another embodiment of a mass transfer unit according to the present invention.

FIG. 5 is yet another embodiment of a MTU. Here, MTU 80 consists of a rigid shell that defines chambers 81 and 82 separated by a flexible membrane 83. As liquid flow in and out of pipes 84 and 85, the membrane surfaces move from side-to-side to move liquids in and out of chamber 81 and 82 while maintaining a boundary between the liquids.

The above description of MTUs is exemplary and many suitable devices using pistons, membranes, liquid surfaces, bellows, and the like are well known to perform the functions identified for the MTU in accordance with the present invention.

The concentrator described above works best when the relative humidity is low. During low humidity times, concentrated brine from the concentrator can be stored in tanks or ponds that are covered by a plastic film so that concentrated brine can be used as needed. Note that the brine does not need to be a saline solution. It can be any solution with a high osmotic pressure, as can readily be found from standard reference texts. Some brine solutions perform well at concentrations that can be maintained even with a relative humidity as high as 60%.

Referring again to FIG. 1, the closed loop system of the present invention can be used without a concentrator if the system is located to access sources of fresh water and saline solution, such as found at the mouths of rivers exiting into an ocean or the like. Then the ocean replaces concentrator 14 and there is no reverse osmosis unit for fresh water production. Pump 15 pumps seawater into MTU 8 as interface 9 moves to discharge diluted saline solution through valve 7 and pipe 13 into the ocean. The sea water intake pipe is located so that it does not intercept fresh river water or diluted saline solution from the discharge pipe.

When valves 7 and 10 are switched, interface 9 moves as seawater is pumped out of volume 8B by pump 12. Seawater is then pumped into SECOND osmotic chamber 4 where its volume is increased by fresh water flow through osmotic membrane 5.

If the osmotic pressure differential across membrane 5 were 300 psi, about 100 kW of power would be produced from three cubic meters of river water per minute.

Note that this process is environmentally neutral since the plant just premixes the river water and seawater and captures the energy of solution in the process.

A possible problem with the application of reverse-osmosis membranes to osmosis devices is that the thin osmosis membranes are typically backed by a fibrous film and a coarser fibrous layer to provide sufficient strength to support the high pressures. This is suitable for reverse-osmosis, since the fresh water coming through the osmosis film will wash out any salts that leak through the membrane. For osmosis, however, where seawater or brackish water is used as the fluid on the low-pressure side of the membrane, salts will penetrate the fibrous layers and be difficult to just wash away since the net flow of liquid is from the low pressure side toward the high pressure side.

In one embodiment of the present invention, some of the fresh water from the fresh water production part of the plant, as shown in FIG. 1, is provided to the osmosis membrane 5. Since the reverse-osmosis unit can produce a larger volume of water from the MTU shown in FIG. 2 than the osmosis unit needs, the reverse-osmosis unit can be used to provide fresh water for the osmosis unit in addition to fresh water for domestic use. This would avoid the salt build-up problem.

Thus, in accordance with the present invention, a power plant is provided that requires only water and relatively dry air to produce electric power and fresh water. No external power would be needed once initial operation was established. Startup power could be provided by any portable power source, such as batteries or portable generators. Power is produced without any concomitant air pollution. The efficient mass transfer units largely avoid energy losses due to moving brine into and out of the high-pressure region. There are still some energy losses as the output motor and attached energy converter, but this encumbers only a relative small volume of liquid, and the energy produced does not have to be used to drive a high pressure pump.

Where desalinated water is not needed, the reverse osmosis unit may be omitted from the plant. Likewise, if only desalinated water is desired, the motor/converter can be eliminated.

As an example of the amount of power that can be produced, consider a plant that used 3 cubic meters of water per minute. If the brine pressure in chamber 4 were 3,000 psi, the power output would be over a megawatt, assuming no reverse osmosis unit.

The foregoing description of method and apparatus for transforming energy stored in concentrated brine solutions for the production of useful output energy has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for generating output energy comprising:

a first osmosis chamber having a first osmotic volume for containing a first water supply and a second osmotic volume for containing a high pressure concentrated brine solution, where the first and second osmotic volumes are separated by a first osmotic membrane and where the brine solution has a salt concentration effective for fresh water flow from the first water supply into the brine solution by osmosis across the osmotic membrane to produce a high pressure relatively dilute brine solution;

a first mass transfer unit defining a first volume and a second volume, where the first and second volumes are separated by a first movable interface;

a first concentrator for concentrating a dilute brine solution to a concentrated brine solution;

a first motor having an inlet connected to the second osmotic volume of the first osmosis chamber and an outlet connected to the first concentrator and generating output energy from the relatively dilute high pressure brine solution directed through the first motor;

a first three-way valve for connecting the first volume of the first mass transfer unit to second osmotic volume of the first osmosis chamber or to the first concentrator; and a second three-way valve for connecting the second volume of the first mass transfer unit to the first concentrator or the second osmotic volume of the first osmosis chamber.

2. Apparatus according to claim 1, further including:

a second mass transfer unit defining first and second volumes separated by a second movable interface;

a reverse osmosis chamber containing an osmotic membrane and having a first volume connectable to the second volume of the second mass transfer unit and a second volume having an outlet for fresh water passing through the osmotic membrane of the reverse osmosis chamber;

a brackish water supply connectable to the second volume of the second mass transfer unit; and a third three-way valve for connecting the reverse osmosis chamber or the brackish water supply to the second volume of the second mass transfer unit.

3. Apparatus according to claim 1, further including a first pump having a low pressure differential for moving the high pressure concentrated brine into the second osmotic volume of the first osmosis chamber from the second volume of the first mass transfer unit.

4. Apparatus according to claim 1, further including a second pump connected for moving concentrated brine solution from the concentrator to the second volume of the first mass transfer unit to move the interface to displace relatively diluted brine solution in the first volume when the first volume is connected to an inlet of the concentrator and the second volume is connected to an outlet of the concentrator.

5. Apparatus according to claim 2, further including a second pump connected for moving concentrated brine solution from the concentrator to the second volume of the first mass transfer unit and move the interface to displace relatively diluted brine solution in the first volume when the first volume is connected to an inlet of the concentrator and the second volume is connected to an outlet of the concentrator.

6. Apparatus according to claim 2, further including a second motor connected to an outlet from the reverse osmosis chamber for producing output energy as the second interface of the second mass transfer unit moves to displace brackish water in the second volume of the second mass transfer unit when the reverse osmosis chamber is connected to the second volume of the second mass transfer unit.

7. Apparatus according to claim 1, wherein the first concentrator further comprises:
- a second osmosis chamber having a first osmotic volume containing the relatively dilute brine solution and a second osmotic volume containing a relatively high concentration brine solution, where the first and second osmotic volumes are separated by a second osmotic membrane wherein fresh water moves from the first osmotic volume to the second osmotic volume by osmosis across the second osmotic membrane;
- a third mass transfer unit having a first volume and a second volume, where the first and second volumes are separated by a movable interface;
- a second concentrator;
- a third motor having an inlet connected to the second osmotic volume of the second osmosis chamber and an outlet connected to the second concentrator;
- a fourth three-way valve for connecting the first volume of the second mass transfer unit to the second osmotic volume of the second osmosis chamber or the second concentrtor; and
- a fifth three-way valve for connecting the second volume of the third mass transfer unit to the second osmotic volume of the second osmosis unit or the second concentrator.

8. A method for generating energy comprising the steps of:
- increasing the pressure and fluid volume of a concentrated brine solution in an osmotic chamber by fresh water flow through an osmotic membrane to form a flow of high pressure diluted brine solution;
- directing a first portion of the flow of the high pressure diluted brine solution into a first volume of a first mass transfer unit to move an interface that causes a flow of concentrated brine solution from a second volume of the mass transfer unit to the osmotic chamber to renew the brine concentration in the osmotic chamber;
- directing a second portion of the high pressure diluted brine solution into a motor to output a low-pressure diluted brine solution;
- inputting the low pressure diluted brine solution into a concentrator to output a concentrated brine solution;
- connecting the first volume of the first mass transfer unit to the concentrator while connecting the second volume of the first mass transfer unit to receive the concentrated brine solution output from the concentrator to fill the second volume of the mass transfer unit with low pressure concentrated brine solution while moving the interface to deliver dilute brine solution in the first volume to concentrator;
- reconnecting the first volume of the mass transfer unit to receive a flow of high pressure dilute brine solution from the osmotic chamber;
- reconnecting the second volume to deliver concentrated brine solution to the osmotic chamber; and
- repeating the above steps to maintain a continuous flow of high pressure diluted brine solution to the motor for outputting useful energy.

9. A method according to claim 8, further comprising the steps of:
- directing a third portion of the flow of high pressure dilute concentration brine solution to a first volume of a second mass transfer unit to move a second interface for outputting brackish water in a second volume of the second mass transfer unit;
- inputting the brackish water to a reverse osmosis chamber for outputting fresh water for use and outputting more concentrated brackish water to a second motor;
- connecting the second volume of the second mass transfer unit to a supply of brackish water while connecting the first volume of the second mass transfer unit to the concentrator to fill the second volume of the second mass transfer unit with brackish water and moving the second piston to transfer dilute concentration brine solution from the first volume of the second mass transfer unit to the concentrator.

* * * * *